(12) United States Patent
Dudar

(10) Patent No.: US 10,927,726 B2
(45) Date of Patent: Feb. 23, 2021

(54) SYSTEM AND METHOD FOR DIAGNOSING A VARIABLE OIL PUMP

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 15/890,075

(22) Filed: Feb. 6, 2018

(65) Prior Publication Data

US 2019/0242279 A1    Aug. 8, 2019

(51) Int. Cl.
*F01M 1/18* (2006.01)
*F01M 1/02* (2006.01)
*F01M 1/20* (2006.01)

(52) U.S. Cl.
CPC ............... *F01M 1/18* (2013.01); *F01M 1/02* (2013.01); *F01M 1/20* (2013.01); *F01M 2001/0246* (2013.01); *F01M 2250/62* (2013.01)

(58) Field of Classification Search
CPC .. F01M 1/18; F01M 1/20; F01M 1/02; F01M 11/10; F01M 2250/62; F01M 2001/0246; F01M 2001/0269; F02D 41/22; F02D 41/221; F04B 51/00; F16N 2260/00; F02N 11/08; B60W 10/30
See application file for complete search history.

(56) References Cited

U.S. PATENT DOCUMENTS

| | | | |
|---|---|---|---|
| 5,339,776 A | 8/1994 | Regueiro | |
| 8,734,122 B2 | 5/2014 | Murray et al. | |
| 8,739,746 B2 | 6/2014 | Bidner et al. | |
| 9,050,966 B2* | 6/2015 | Wakita | B60W 10/06 |
| 9,217,379 B2 | 12/2015 | Willard et al. | |
| 2018/0172143 A1* | 6/2018 | Tsukizaki | B60W 20/50 |
| 2019/0136854 A1* | 5/2019 | Watanabe | F04B 51/00 |

OTHER PUBLICATIONS

Dudar, A., "Engine Variable Oil Pump Diagnostic Method," U.S. Appl. No. 15/792,693, filed Oct. 24, 2017, 42 pages.

* cited by examiner

*Primary Examiner* — Grant Moubry
(74) *Attorney, Agent, or Firm* — Geoffrey Brumbaugh; McCoy Russell LLP

(57) ABSTRACT

Methods and systems are provided for diagnosing variable oil pump degradation. In one example, a method may include cranking an engine with a motor and monitoring the motor current draw from a battery during cranking. The method may indicate degradation of a variable oil pump coupled to the engine by comparing the motor current draw with a baseline current level.

16 Claims, 9 Drawing Sheets

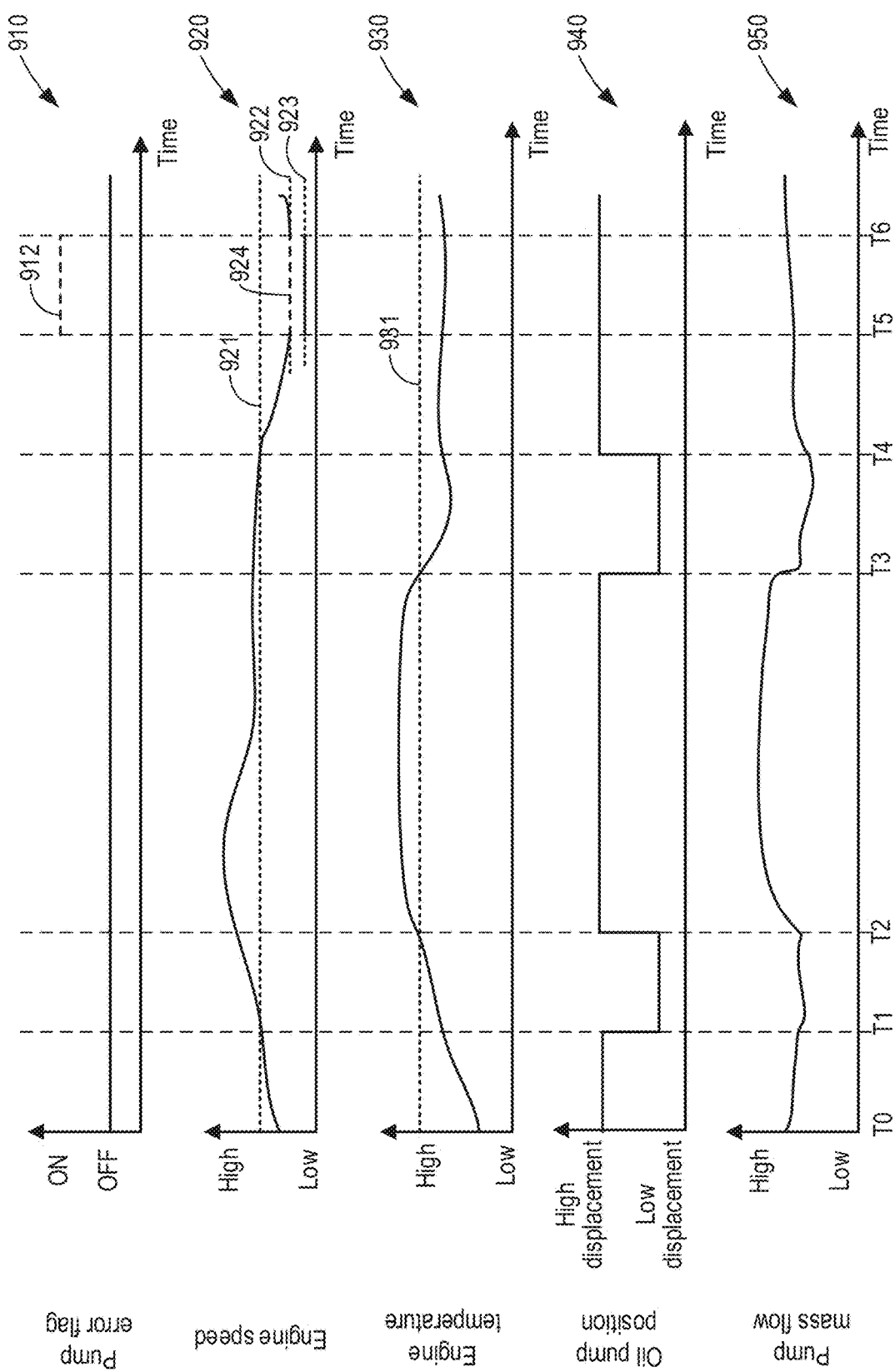

SYSTEM AND METHOD FOR DIAGNOSING A VARIABLE OIL PUMP

FIELD

The present description relates generally to methods and systems for diagnosing a variable oil pump.

BACKGROUND/SUMMARY

A variable oil pump driven by a crankshaft may provide engine oil at a pressure optimized for efficient engine operation and improved fuel efficiency. The position of the variable oil pump may be adjusted responsive to engine speed. At low engine speed, the variable oil pump may be set in a high displacement mode for providing lubrication to the engine moving parts. At high engine speed, as the rotation speed of the variable oil pump increases with increased rotation speed of the crankshaft, the variable oil pump may be set to a low displacement mode for reduced volumetric oil displacement per revolution of the pump. Degradation of the variable oil pump may cause the pump to be stuck at one displacement position. For example, a degraded variable oil pump stuck in the low displacement position may increase engine wear due to reduced oil flow.

Attempts for variable oil pump diagnosis include identifying degradation of a piston-cooling jet system based on engine oil pressure. One example approach is shown by Bidner et al. in U.S. Pat. No. 8,739,746. Therein, degradation of the variable oil pump is determined based on the relationship between the engine oil pressure and the engine speed during the maximum oil pump displacement condition. However, the inventors herein have recognized potential issues with diagnosing function of the variable oil pump based on the engine oil pressure. As one example, the diagnosis may lack robustness because under some conditions the engine oil pressure may experience high and frequent fluctuations responsive to changes in engine and vehicle operating conditions. Further, the diagnosis may lose accuracy due to oil pressure sensor degradation.

In one example, the issues described above may be addressed by a method comprising cranking the engine with a motor, and indicating degradation of an oil pump coupled to the engine based on a current of the motor sensed during the cranking. In this way, oil pump degradation may be determined more accurately.

As one example, an engine may be started by cranking a crankshaft with an electric motor. The electric motor draws current from a battery to overcome the friction generated during cranking. The amplitude of the motor current relates to the amount of the friction. During cranking, a variable oil pump supplies oil to lubricate moving parts of the engine and reduce the friction. As such, the amplitude of the motor current may indicate whether sufficient lubrication is provided by the variable oil pump. As one example, a degraded variable oil pump may cause the motor current to be higher than a baseline current level. By diagnosing the variable oil pump during engine cranking, the number of engine and vehicle operating parameters that can affect pump diagnosis may be reduced, which results in a more robust diagnosis.

As another example, the engine may first be cranked with the variable oil pump in, or commanded to be in, a first position, and then be cranked with the variable oil pump in, or commanded to be in, a second, different, position. The pump function may be diagnosed by comparing the motor current while cranking the engine in the first and the second pump positions. In one embodiment, the variable oil pump may be set to a low displacement position with low volumetric oil displacement by activating a solenoid valve, and to a high displacement position with high volumetric oil displacement by de-activating the solenoid valve. The engine may first be cranked with the variable oil pump in the high displacement position, and subsequently be cranked with the variable oil pump in the low displacement position. If the motor current during high volumetric oil displacement cranking is higher than a baseline current level, and is not lower than the current during low volumetric oil displacement cranking, the variable oil pump may stick to the low displacement position. By alternating the variable oil pump position during cranking, the type of the pump degradation may be determined. The method may further include mitigating the degradation responsive to the type of the degradation. For example, if the variable oil pump is stuck in the low displacement position, the engine idle speed may be increased during engine operation to reduce engine wear caused by insufficient lubrication.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 shows timelines of parameters while executing the method of FIG. 8.

DETAILED DESCRIPTION

Figure 1:
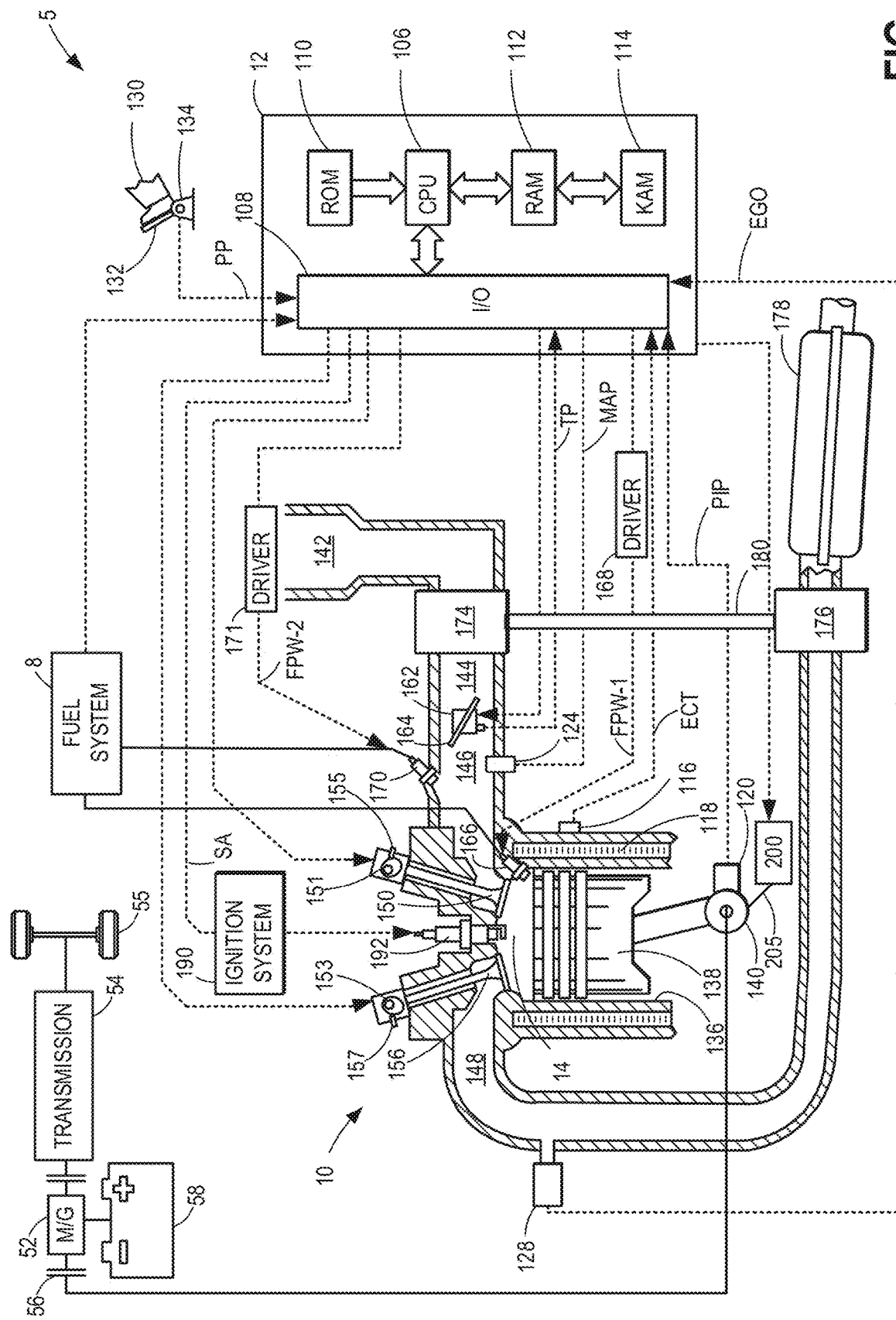
FIG. 1 shows a diagram of an example embodiment of an engine system of a vehicle.
Figure 4:
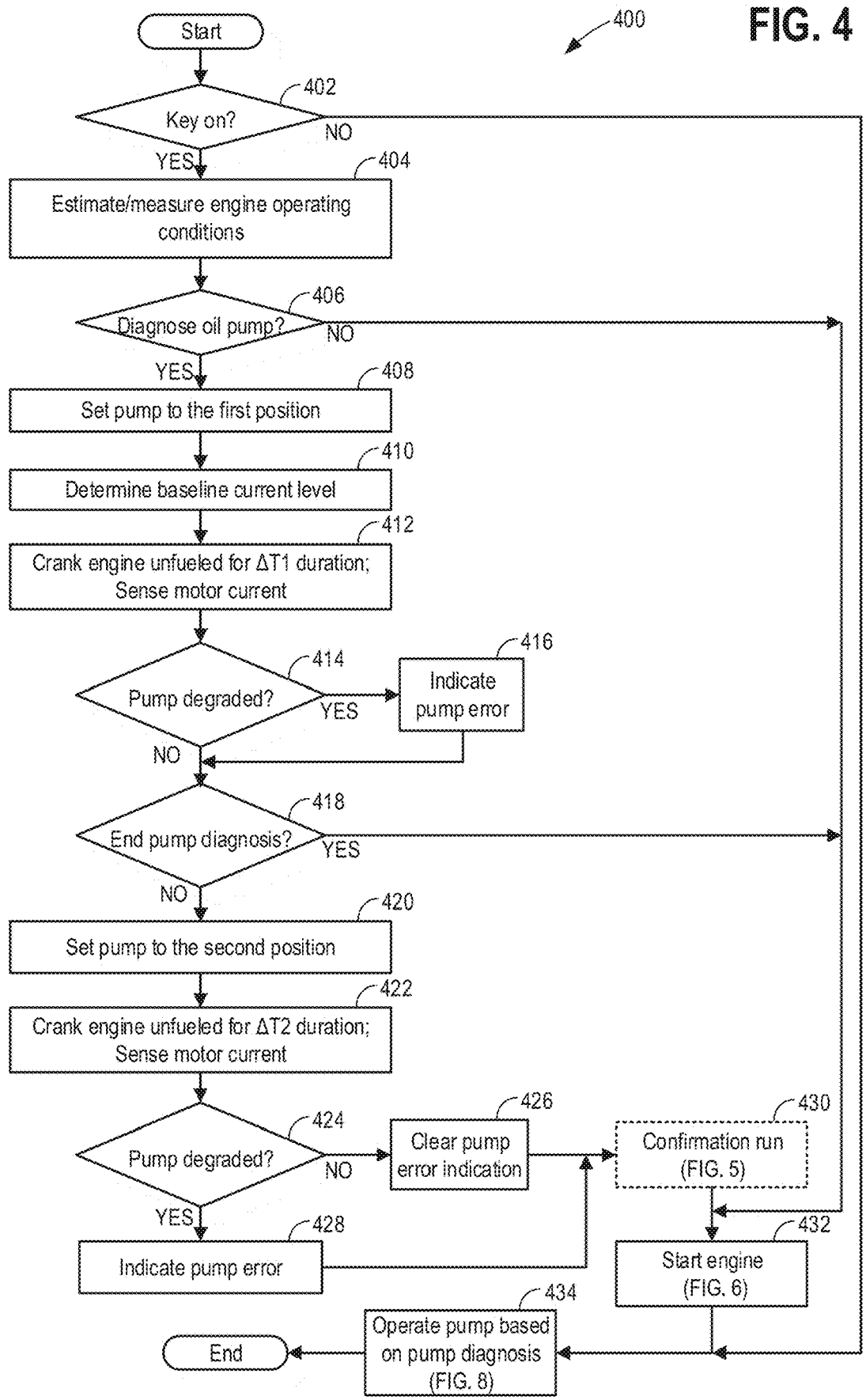
FIG. 4 is a high level flow chart of an example method for diagnosing a variable oil pump.
Figure 5:
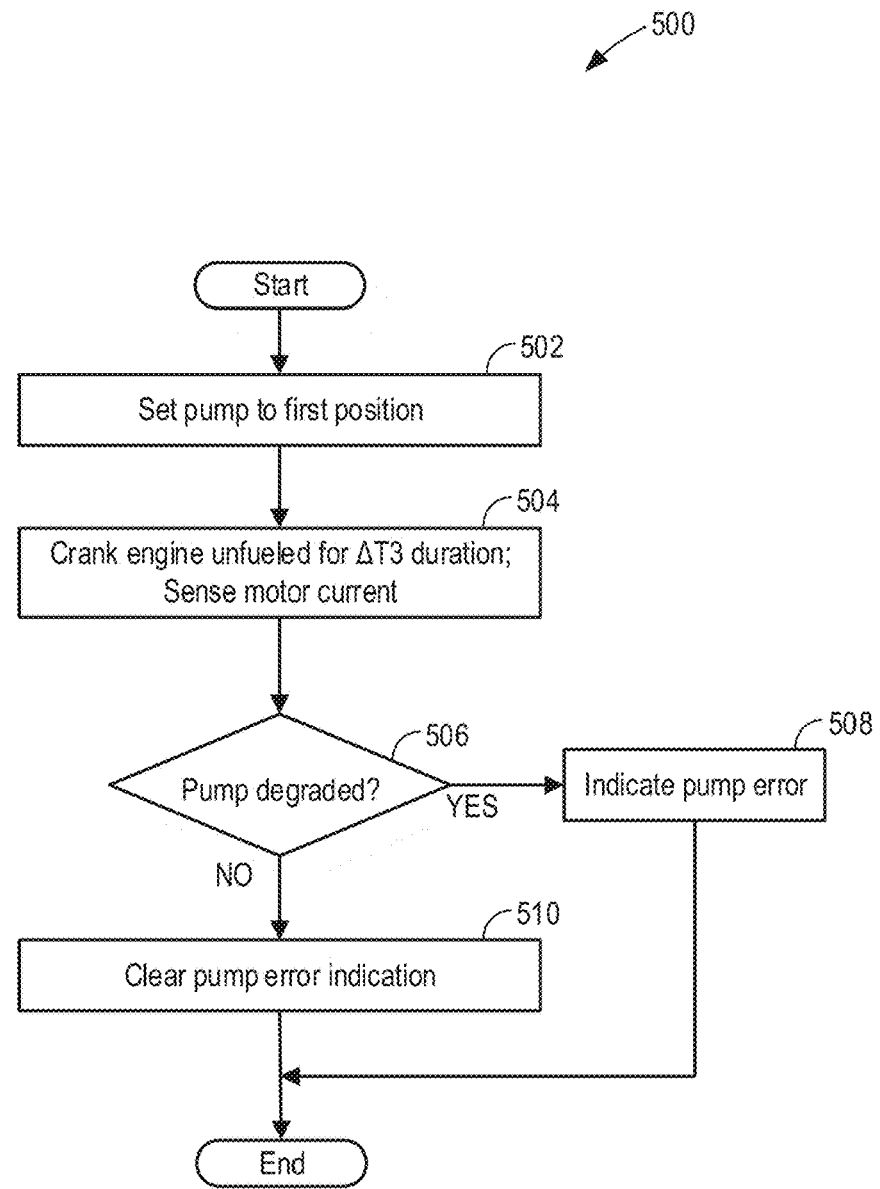
FIG. 5 shows an example method for confirming the diagnostic result of FIG. 4.
Figure 6:
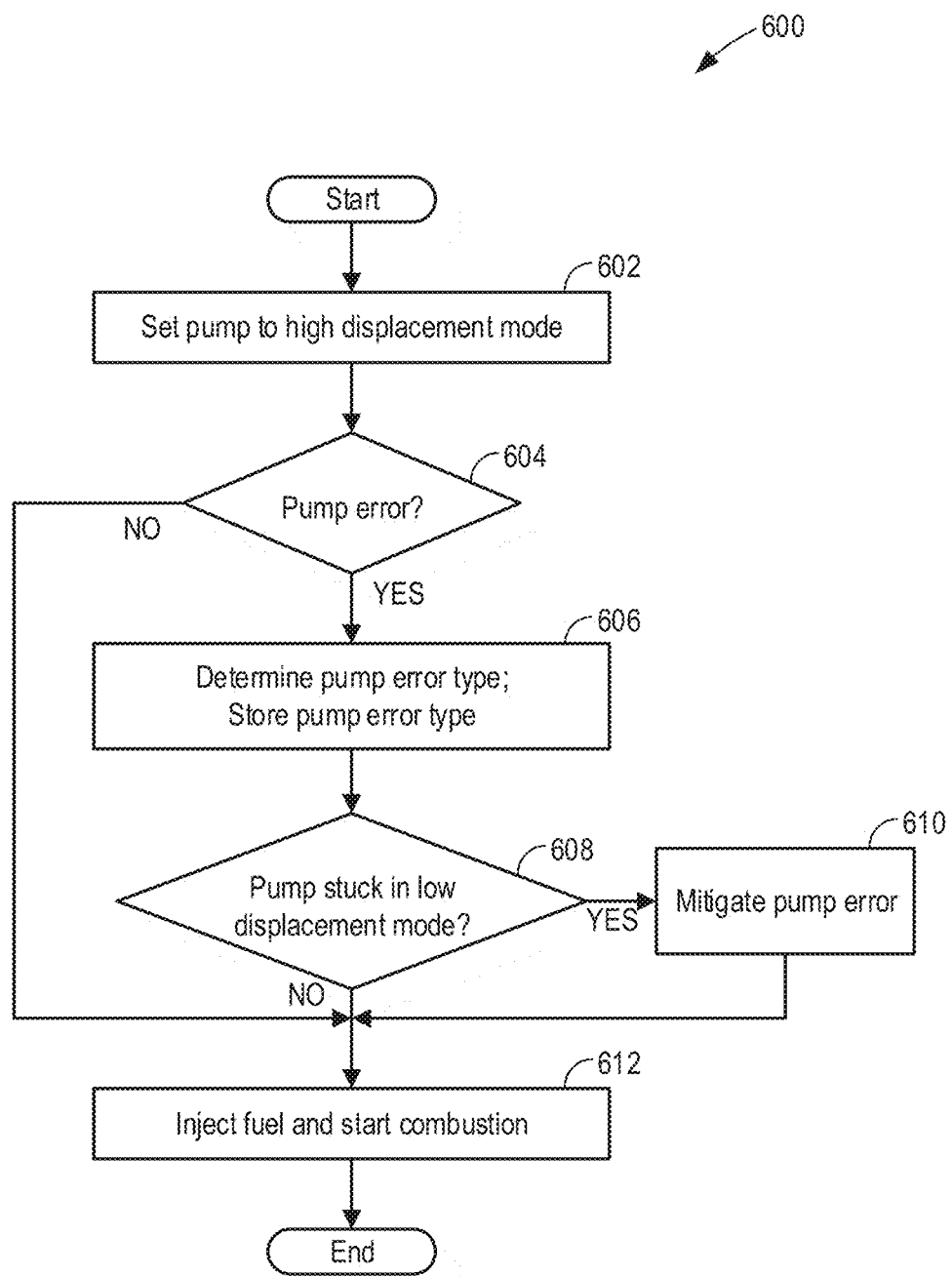
FIG. 6 shows an example method of operating the engine system responsive to the variable oil pump diagnosis of FIG. 4 and FIG. 5.
Figure 7:
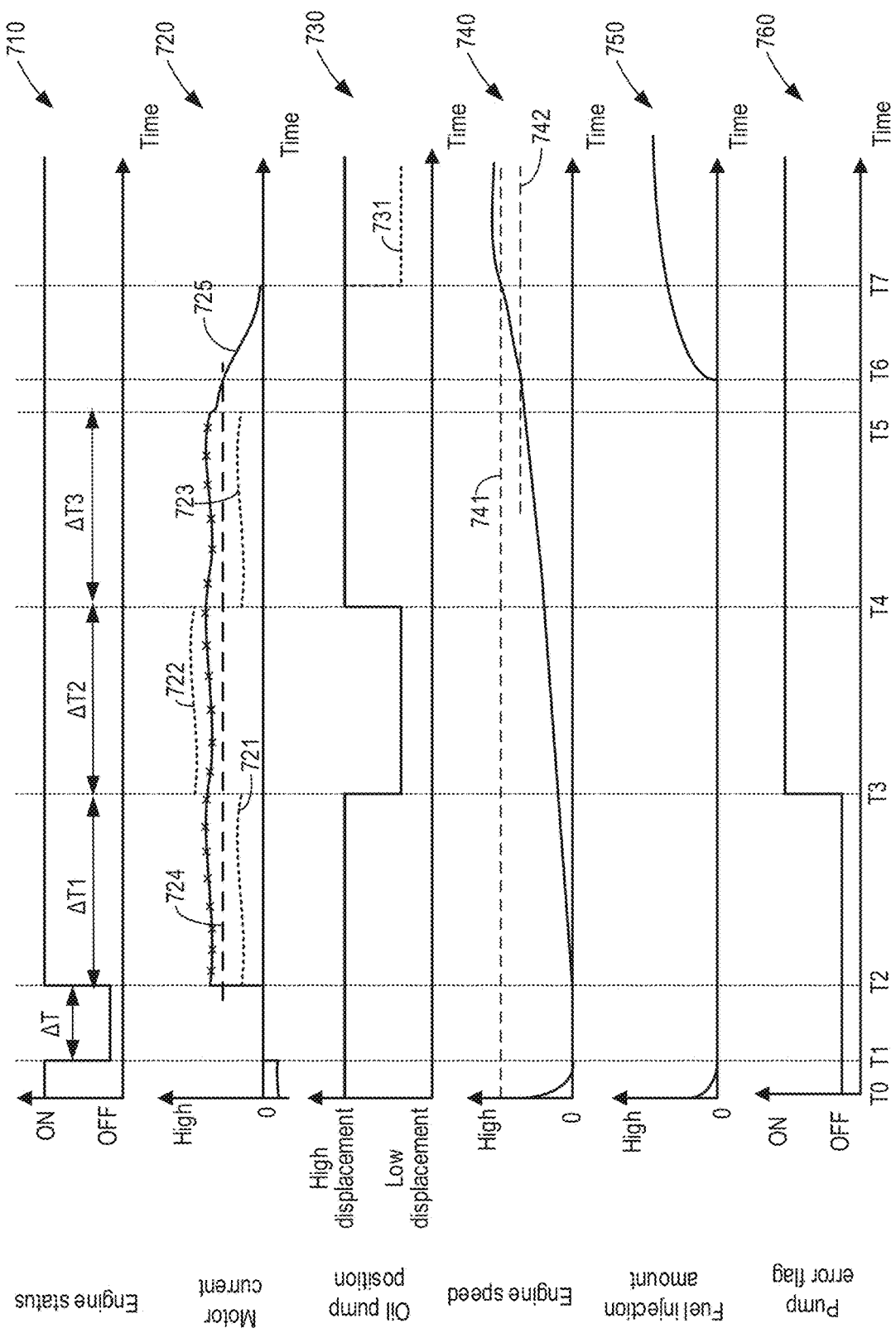
FIG. 7 shows timelines of parameters while executing the method of FIGS. 4-6.

The following description relates to systems and methods for diagnosing a variable oil pump coupled to the crankshaft of a vehicle, such as the vehicle 5 of FIG. 1. The variable oil pump is included in an oil system, such as the oil system of FIG. 2, for supplying engine oil to various moving parts of the engine during engine operation. The variable oil pump may adjust the volumetric oil displacement of the pump by switching between two positions. An example of the variable oil pump is shown in FIG. 3, wherein the variable oil pump may switch between a high displacement position and a low displacement position by activate or deactivate a solenoid valve. FIG. 4 shows an example method of diagnosing the function of the variable oil pump based on the motor current while cranking the engine with the motor. For example, during cranking, variation in motor current while switching the oil pump between different displacement positions may be used to determine the pump degradation. FIG. 5 is a subroutine for confirming the pump diagnosis made in FIG. 4. The type of pump degradation may also be identified based on the motor current. The engine operation may further be adjusted to mitigate the pump degradation based on the degradation type, as shown in FIG. 6. The timelines of parameters while implementing the method of FIGS. 4-6 are shown in FIG. 7. Based on the pump diagnosis, the oil pump may be operated according to a method shown in FIG. 8 after engine start. FIG. 9 shows the timelines of parameters while implementing the method of FIG. 8.

Turning now to FIG. 1, an example embodiment of an internal combustion engine 10 of vehicle 5 is shown. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the vehicle system via a transmission system. Crankshaft 140 may be mechanically coupled to a variable oil pump 200 of an oil system (such as the oil system shown in FIG. 2) via driving shaft 205. The crankshaft 140 may provide rotary power to operate the variable oil pump 200. The output flow rate of the variable oil pump may be adjusted by adjusting the volumetric oil displacement of the oil pump. The displacement may be controlled by controller 12. One example embodiment of the variable oil pump is shown in FIG. 3.

Cylinder 14 can receive intake air via intake passage 142, induction passage 144, and intake manifold 146. Intake manifold 146 may communicate with other cylinders of engine 10 in addition to cylinder 14. In some embodiments, one or more of the intake passages may include a boosting device such as a turbocharger or a supercharger. For example, FIG. 1 shows engine 10 configured with turbocharger including compressor 174 arranged between intake passage 142 and induction passage 144, and an exhaust turbine 176 arranged between exhaust manifold 148 and emission control device 178. Compressor 174 may be at least partially powered by exhaust turbine 176 via shaft 180 where the boosting device is configured as a turbocharger. Throttle 162 may include a throttle plate 164, and may be provided along an intake passage of the engine for varying the flow rate and/or pressure of intake air provided to the engine cylinders. For example, throttle 162 may be disposed downstream of compressor 174 or alternatively may be provided upstream of compressor 174.

Exhaust manifold 148 may receive exhaust gases from other cylinders of engine 10 in addition to cylinder 14. Exhaust gas sensor 128 is shown coupled to exhaust manifold 148 upstream of emission control device 178, but it will be appreciated that it may be located at other locations in the exhaust system. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Each cylinder of engine 10 may include one or more intake valves and one or more exhaust valves. For example, cylinder 14 is shown including at least one poppet-style intake valve 150 and at least one poppet-style exhaust valve 156 located at an upper region of cylinder 14. The intake valve 150 and exhaust valve 156 may be coupled with a camshaft. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT), and/or variable valve lift (VVL) systems that may be operated by controller 12 to vary valve operation. Whether electronically actuated or cam actuated, the timing of exhaust and intake valve opening and closure may be adjusted as specified for desired combustion and emissions-control performance. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. Additionally, a VCT system may include one or more VCT devices (not shown) that may be actuated to adjust the timing of the intake and exhaust valves to a timing that provides decreased positive intake to exhaust valve overlap. That is to say, the intake and exhaust valves will be open for a shorter duration and will move away from being simultaneously open for a portion of the intake stroke. In still other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 may provide an ignition spark to cylinder 14 via spark plug 192 in response to spark advance signal SA from controller 12, under select operating modes. In other embodiments, compression-ignition engines may use a glow plug in place of spark plug 192.

In some embodiments, each cylinder of engine 10 may be configured with one or more injectors for delivering fuel to the cylinder 14. As a non-limiting example, cylinder 14 is shown including two fuel injectors 170 and 166. Fuel injectors 170 and 166 may be configured to deliver fuel received from fuel system 8 via a high pressure fuel pump and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake manifold 146, rather than in cylinder 30, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single electronic driver 168 or 171 may be used for both fuel injection systems, or multiple drivers, for example electronic driver 168 for fuel injector 166 and electronic driver 171 for fuel injector 170, may be used, as depicted.

Fuel may be delivered by both injectors to the cylinder during a single cycle of the cylinder. For example, each injector may deliver a portion of a total fuel injection that is combusted in cylinder 30. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 30.

Controller 12 is shown as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of engine coolant temperature (ECT) from temperature sensor 116 coupled to cooling sleeve 118; a profile ignition pickup signal (PIP) from Hall effect sensor 120 (or other type) coupled to crankshaft 140; throttle position (TPS) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory chip 110 can be programmed with computer readable data representing instructions executable by microprocessor unit 106 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting the mass flow of the variable oil pump include adjusting position of a control chamber of the variable pump by actuating or deactivating a solenoid valve to adjust the displacement of the a spring coupled to the control chamber.

In some examples, vehicle 5 may be a hybrid vehicle with multiple sources of torque available to one or more vehicle wheels 55. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power (e.g. draws current) from a battery 58 to provide torque to vehicle wheels 55. Electric machine 52 may also be operated as a generator to provide electrical power to charge battery 58, for example during a braking operation. In one example, the electric machine 52 may draw current from battery 58 and rotate the crankshaft 140 from stop (zero speed) in order to start the engine that is at rest. A sensor may be electrically coupled to the motor and/or the battery for measuring the current flow. The motor may draw current from the battery during cranking, and charge the battery during regenerative braking.

Figure 2:
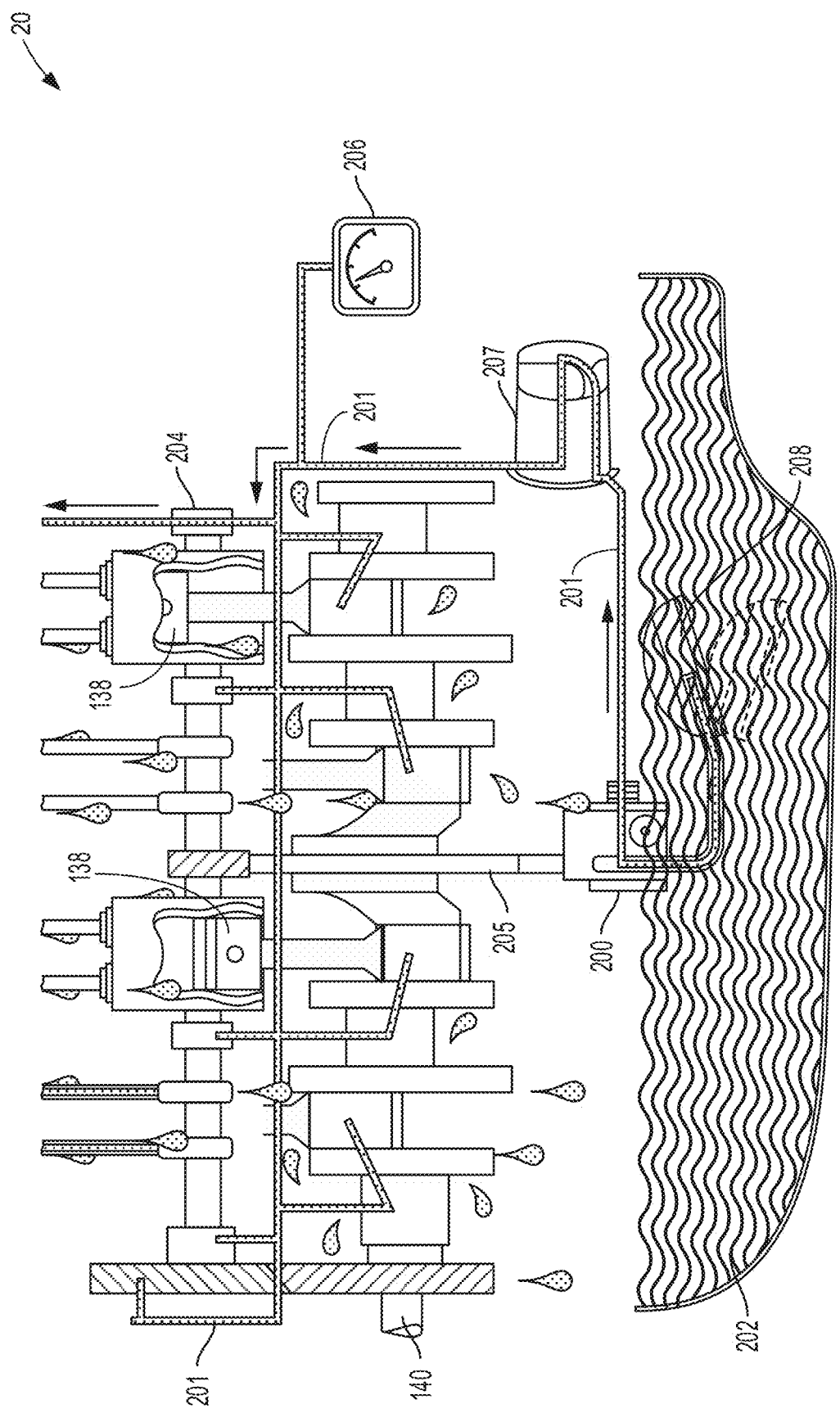
FIG. 2 shows an example oil system for an engine system.

Turning to FIG. 2, FIG. 2 shows an example oil system 20 for an engine system (such as the engine 10 of FIG. 1). The oil system 20 may include a variable oil pump for supplying engine oil from the oil pan to various engine parts via the oil galleries. The various engine parts may include camshaft 204, piston 138, crankshaft 140, and cylinder 14. The variable oil pump 200 may be driven by crankshaft 140 via the driving shaft 205. The rotation speed of the pump increases as rotation speed of the crankshaft increases. The engine oil enters the variable oil pump from a floating oil intake 208 dispensed in the oil pan 202. The floating oil intake may include a filter for filtering the engine oil. The variable oil pump 200 may be submerged in the engine oil of the oil pan. The variable oil pump may pump the engine oil along the oil galleries through filter 207 and oil gauge 206 before releasing the engine oil to the various engine parts. The engine oil may then return back into the oil pan through gravity force.

Figures 3A, 3B:
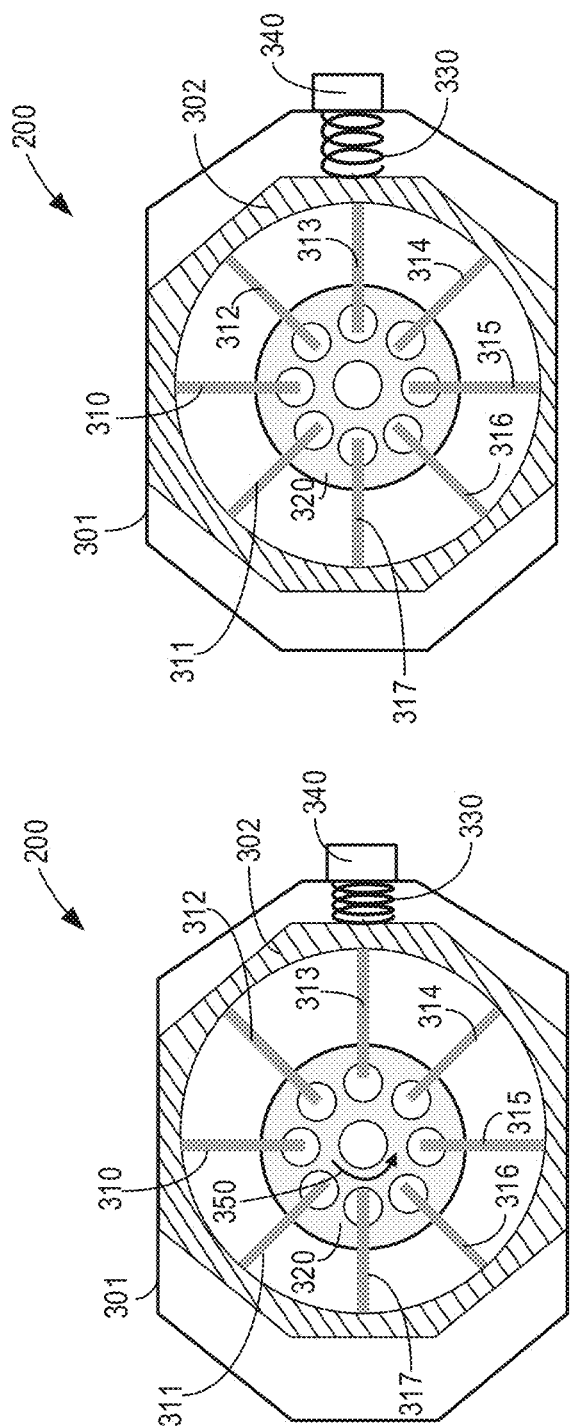
FIG. 3A shows an example variable oil pump in a high displacement mode.
FIG. 3B shows the example variable oil pump of FIG. 3A in a low displacement mode.

FIGS. 3A and 3B show an example variable oil pump 200 in the high displacement mode and low displacement mode, respectively. In the high displacement mode of FIG. 3A, the variable oil pump is set to be in the high displacement position. In the low displacement mode of FIG. 3B, the variable oil pump is set to be in the low displacement position. The variable oil pump 30 includes a control chamber 302 that may slide within the working chamber 301 by displacing the spring 330 coupled between the control chamber 302 and the working chamber 301. The spring 330 may be displaced by activating or de-activating the solenoid valve 340. As one example, when the solenoid valve 340 is deactivated, the control chamber 301 is in its default high displacement position, as shown in FIG. 3A. When the solenoid valve 340 is activated, the control chamber 301 is in the low displacement position, as shown in FIG. 3B.

The variable oil pump 30 includes a rotor 320 coupled to the crankshaft (such as crankshaft 140 of FIG. 1) of the engine. Driven by the crankshaft, the rotor may rotate in a direction shown as arrow 350 relative to its central axis. A plurality of sliding vanes (310, 311, 312, 313, 314, 315, 316, and 317) may be coupled to the rotor 350, extending toward and in contact with the inner surface of the control chamber 302. As the control chamber changes its position, the sliding vanes slide relative to the rotor.

At the high displacement position (FIG. 3A), the volumetric oil displacement per revolution of the pump is higher comparing to the pump at the low displacement position (FIG. 3B). In other words, with the same crankshaft rotation speed, the volumetric flow (e.g. cm/min) of the pump in the high displacement mode is greater than the volumetric flow of the same pump in the low displacement mode. Therefore, by switching from the high displacement mode to the low displacement mode responsive to the engine speed higher than a threshold, the total volumetric flow of the oil supplied to the engine parts may remain the same.

Turning to FIG. 4, an example method 400 for diagnosing the variable oil pump function is shown. The variable oil pump may be diagnosed while cranking the engine unfueled from stop with a motor. The motor draws current from a battery electrically coupled to the motor. As the motor current increases with the increased friction of the engine system, the motor current may indicate the amount of engine oil provided to the engine moving parts during cranking. Based on the motor current drawn from the battery, the function of the variable oil pump may be diagnosed. Method 400 may also include switching the variable oil pump between the high displacement mode and the low displacement mode, and determine the pump degradation based on the change in the motor current. Based on the motor current, method 400 may identify the type of the degradation, that is, whether the pump is stuck in the high or low displacement mode. Based on the type of the degradation, corresponding mitigation actions may be executed.

Instructions for carrying out method 400 and the rest of the methods included herein may be executed by a controller (such as controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, method 400 monitors the key on event of the vehicle system. The key on event may be an engine start command when the crankshaft of the engine is commanded to start rotating from at rest. The key on event may include inserting the key to the vehicle or activate a key fob remote. In another embodiment, the key on event may include projected engine start command within a predetermined time duration in the future. For example, the key on event may be a programmed engine start event within 2 minutes. If controller 12 detects a key on event, method 400 moves to step 404. Otherwise, method 400 exits.

At 404, method 400 estimates or measures engine operating conditions. For example, the controller may acquire measurements from various sensors in the engine system and estimates operating conditions including engine torque output, engine speed, vehicle speed, atmospheric pressure, ambient temperature, boost pressure, and engine load.

At 406, method 400 determines whether to diagnose the function of the variable oil pump. In one embodiment, the variable oil pump diagnosis may be executed based on the engine soak time before the key on event of 402. For example, the variable oil pump may be diagnosed responsive to the engine soak time greater than a threshold duration. The threshold duration may be a time period required for the engine to cool down. The threshold duration may be adjusted based on engine operating history before the immediate engine stop and the ambient temperature. For example, the threshold duration may increase responsive to high engine speed during the immediate engine run and increased ambient temperature. In another embodiment, the variable oil pump diagnosis may be executed based on engine temperature. For example, controller 12 may estimate or measure the engine temperature, and diagnose the variable oil pump when the engine temperature is lower than a threshold temperature. The threshold temperature may be a temperature threshold below which the motor current increases with increased friction among engine parts. In another embodiment, the variable oil pump may be diagnosed when the duration from previous pump diagnosis is longer than a predetermined time duration. If it is determined to diagnose the pump, method 400 moves to 408. Otherwise, method 400 moves to 432 to start the engine.

At 408, the variable oil pump is set to a first position. In one embodiment, the first position may be the high displacement position. In one example, the controller may deactivate the solenoid valve (such as solenoid valve 340 of FIG. 3A) to move the variable oil pump to its default high displacement position. In another example, step 408 may be skipped if the engine was stopped with the variable oil pump in its default high displacement position. In another embodiment, the first position may be the low displacement position. In one example, the controller may activate the solenoid valve (such as solenoid valve 340 of FIG. 3B) to move the variable oil pump to the low displacement position by displacing the spring (such as spring 330 of FIG. 3B).

At 410, method 400 determines a baseline current level. In one example, the baseline current level may be a motor current level when cranking engine system at low engine temperature (such as 40-90 degrees centigrade) or after a long soak with the minimum possible friction, while the variable oil pump is in the low displacement position. In another example, the baseline current level may be a motor current level when cranking at low engine temperature (such as 40-90 degrees centigrade) or after a long soak with the maximum possible friction, while the variable oil pump is in the high displacement position.

In one embodiment, the baseline current level may be determined based on ambient temperature and the engine soak time before the key on event at 402. In one embodiment, the baseline current level may be determined based on a 3D lookup table stored onboard the vehicle. The baseline current level may increase with increased engine soak time, and decrease with decreased ambient temperature. The 3D lookup table may be calibrated with the variable oil pump in the first position of 408. In another embodiment, the baseline current level may be determined based on engine temperature. For example, the baseline current level may decrease with increased engine temperature. The engine temperatures and their corresponding calibrated baseline current levels may be stored in a 2D lookup table. In yet another embodiment, the baseline level may be determined based on the ambient temperature via a 2D lookup table. The ambient temperatures and their corresponding calibrated baseline current levels may be stored in the 2D lookup table.

At 412, method 400 cranks the engine unfueled for a first duration of ΔT1 and senses the motor current drawn from the battery (such as battery 58 of FIG. 1). In one embodiment, the controller deactivates the fuel injectors, and rotates the crankshaft (such as crankshaft 140 of FIGS. 1 and 2) from stop to move the piston relative to the cylinder. The rotated crankshaft also drive the variable oil pump to deliver engine oil from the oil pan (such as oil pan 202 of FIG. 2) to various parts of the engine system. The first duration ΔT1 may be a time period from the moment that a particular amount of engine oil is pumped output of the oil pan to the moment that the particular amount of the engine oil drips back into the oil pan. The controller may sample the motor current during the first duration and calculate a first motor current A1. As one example, the controller may calculate the first motor current by averaging the sampled current during the first duration. As another example, the controller may calculate the first motor current by taking the minimum or maximum of the current sampled during the first duration. Herein, when analyzing the sensed (or sampled) motor current during a duration, the calculated motor current during the duration (such as the first motor current A1) may be used.

In one embodiment, the vehicle is an autonomous vehicle. The first duration ΔT1 may be set to be longer than the non-autonomous vehicle, that is, longer than the time period from the moment that a particular amount of engine oil is pumped output of the oil pan to the moment that the particular amount of the engine oil drips back into the oil pan. In one example, the first duration may be a function of engine operating conditions including the engine oil temperature. The engine oil temperature may be estimated based on ambient temperature and engine coolant temperature. For example, the first duration may increase with decreased engine oil temperature. By increasing the crank duration with decreased engine oil temperature, the pump rotation speed may have sufficient time to stabilize, and accurate friction estimation based on motor current may be achieved.

At 414, method 400 determines whether the variable oil pump is degraded by comparing the motor current at 412 with the baseline current level determined at 410. In one embodiment, if the first position in step 408 is the high displacement position, method 400 may determine that the pump is degraded responsive to the sensed motor current not less than the baseline current level. For example, the sensed motor current is not less than the baseline current if the calculated motor current A1 is not less than the baseline current. In this situation, the variable oil pump may be stuck in the low displacement position. In another embodiment, if the first position in step 408 is the low displacement position, method 400 may determine that the pump is degraded responsive to the sensed motor current at 412 not greater than the baseline current level. For example, the sensed motor current is not greater than the baseline current level if the calculated motor current A1 is not greater than the baseline current level. In this situation, the variable oil pump may be stuck in the high displacement position. If the controller determines that the pump is degraded, method 400 may indicate pump error at 416. The indication may include one or more of sending error message to the cloud, displaying the pump error to the operator, and setting a diagnostic code that can be read by a diagnostic reader. If the controller finds no pump degradation, method 400 moves to 418.

At 418, method 400 determines whether to stop the variable pump diagnosis procedure. In one embodiment, the diagnosis may be stopped if there is high confidence that the diagnostic result at step 414 is correct. For example, the confidence in the diagnosis may be high if the difference between the measured motor current draw at 412 and the baseline current level at 410 is greater than a threshold (such as 30% of the baseline current level). In another embodiment, the diagnosis may be stopped responsive to imminent engine combustion event. In yet another embodiment, step 418 may be skipped. If the diagnosis needs to be stopped, method 400 moves to 432 to start the engine. If the controller determines to continue the diagnosis, method 400 moves to 420.

At 420, method 400 sets the variable pump to a second position. The second position is different from the first position of 408. For example, the first position is the high displacement position, and the second position is the low displacement position. For another example, the first position is the low displacement position, and the second position is the high displacement position.

At 422, method 400 cranks the engine unfueled for a second duration ΔT2, and senses the motor current drawn from the battery during the second duration. In one embodiment, the second duration is the same length as the first duration ΔT1. As one example, the controller may calculate a second motor current A2 by averaging the current sampled during the second duration. As another example, the controller may calculate the second motor current A2 by taking the minimum or maximum of the current sampled during the second duration.

At 424, method 400 400 determines whether the variable oil pump is degraded based on the sensed motor current during the first duration and the second duration. In one embodiment, the first position is the high displacement position and the second position is the low displacement position. The controller may determine that the pump is degraded if the sensed motor current during the first duration is not lower than the sensed motor current during the second duration. For example, the pump may degrade if the first calculated motor current A1 of 412 is not lower than the second calculated motor current A2 of 422. In another embodiment, the first position is the low displacement position and the second position is the high displacement position. The controller may determine that the pump is degraded if the sensed motor current during the first duration is not greater than the sensed motor current during the second duration. For example, the controller may determine that the pump is degraded if the first calculated motor current A1 of 412 is not greater than the second calculated motor current A2 of 422.

The current draw of the motor from the battery during engine cranking indicates the amount of engine friction that the motor needs to overcome to rotate the crankshaft. As the engine friction decreases with the increased engine oil supply during cranking, the amount of engine friction may indicate the displacement of the variable oil pump. Therefore, the pump may be degraded if the motor current draw does not change responsive to the change in the displacement of the variable oil pump.

Responsive to pump degradation, similar to step 416, the pump error may be indicated at 428. Otherwise, the pump error indication may be cleared at 426.

At 430, method 400 may optionally execute the confirmation run to test the pump diagnostic results. Details of the confirmation run are shown in FIG. 5. In one example, method 400 may execute the confirmation run if the diagnosis in step 414 and step 424 are not consistent. In another example, method 400 may execute the confirmation run if there is sufficient time to complete the confirmation run. For example, the confirmation run may be executed if the time to the projected fuel injection is greater than the first duration $\Delta T1$.

At 432, method 400 starts the engine by injecting fuel and initiating the combustion. Method 400 may also determine the type of the pump degradation and mitigate the degradation during the subsequent engine operation. Details of the engine staring procedures are shown in FIG. 6.

Figure 8:
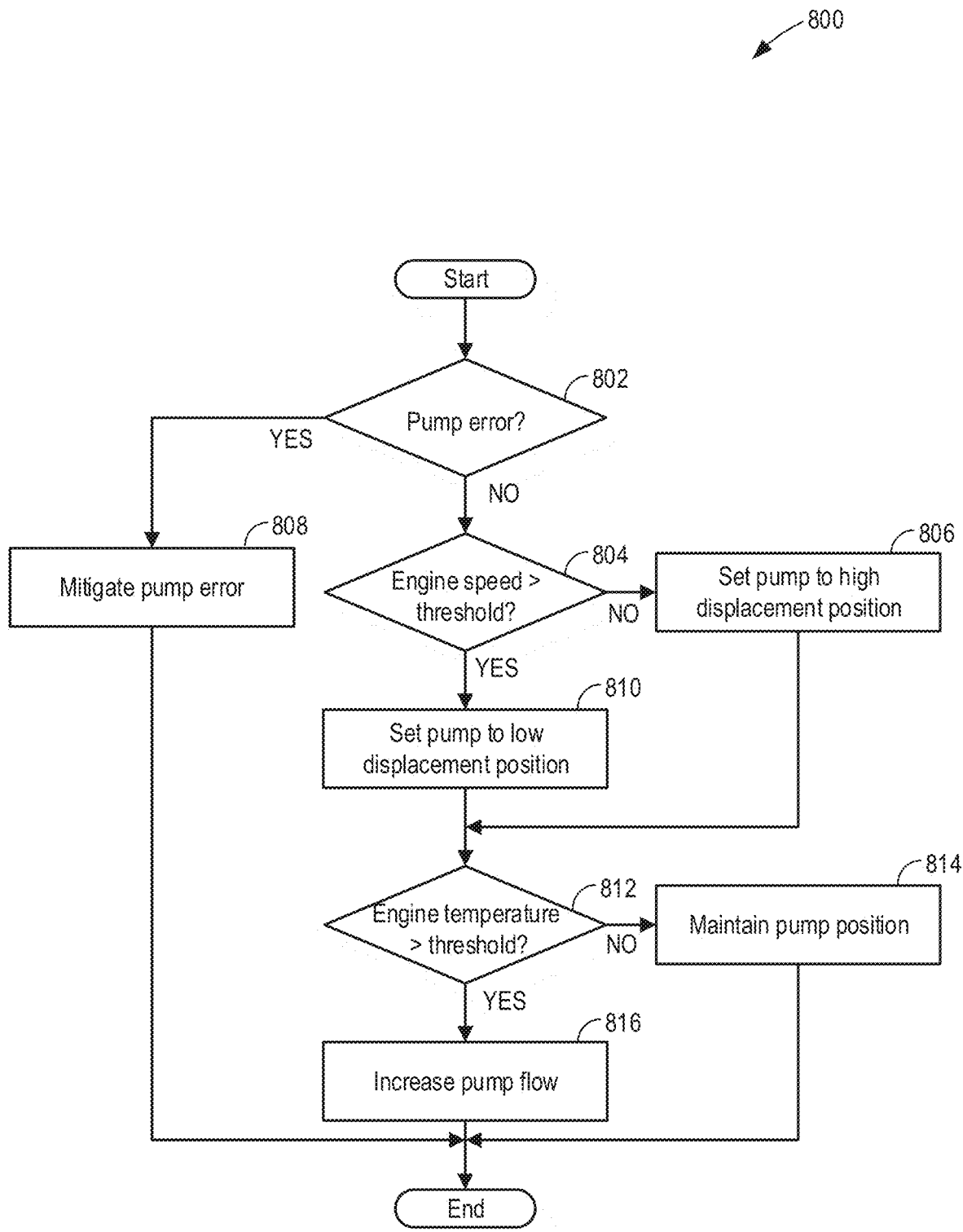
FIG. 8 shows an example method of operating a variable oil pump based on the diagnosis of FIGS. 4-6.

At 434, method 400 operates the oil pump based on the pump diagnosis after starting the engine. Details of the pump operations are shown in FIG. 8.

FIG. 5 is an example method 500 for confirming the variable oil pump diagnosis. Method 500 may be optionally executed by the controller (such as controller 12) to confirm that the diagnosis made in steps 412 and 414 are correct.

At 502, method 500 sets the variable pump to the first position. For example, the variable pump may be set to the first position by activating or deactivating the solenoid valve (such as solenoid valve 340 of FIGS. 3A and 3B).

At 504, the engine is cranked unfueled for a third duration $\Delta T3$, and the motor current is sensed (or sampled) during the third duration. As one example, the controller may calculate a third motor current A3 by averaging the current sampled during the third duration. As another example, the controller may calculate the third motor current A3 by taking the minimum or maximum of the current sampled during the third duration. In one example, the third duration $\Delta T3$ may be the same as the first duration $\Delta T1$.

At 506, method 500 determines whether the pump is degraded based on the motor currents sensed during the second duration and the third duration. In one embodiment, the first position is the high displacement position and the second position is the low displacement position. The controller may determine that the pump is degraded if the sensed motor current during the third duration is not lower than the sensed motor current during the second duration. For example, the controller may determine that the pump is degraded if the third motor current A3 is not lower than the second motor current A2 of 422. In another embodiment, the first position is the low displacement position and the second position is the high displacement position. The controller may determine that the pump is degraded if the sensed motor current during the third duration is not greater than the sensed motor current during the second duration. For example, the controller may determine that the pump is degraded if the third motor current is not greater than the second motor current A2 of 422. Responsive to pump degradation, similar to step 416, the pump error may be indicated at 508. Otherwise, the pump error indication may be cleared at 510.

FIG. 6 shows an example method 600 for starting the engine after variable pump diagnosis. Method 600 may also include operating the engine responsive to the type of variable pump degradation.

At 602, method 600 sets the pump to the high displacement position. In one embodiment, the high displacement position is the default position of the variable pump, when the solenoid valve is deactivated.

At 604, method 600 checks the status of the pump error flag. If the pump error flag is set, method 606 moves to 606 to determine the type of the pump degradation. If the pump error flag is not set, method 600 moves to 612.

At 606, the type of pump degradation is determined based on the sensed motor current and the baseline current level from step 410. As one example, the type of pump degradation may be determined based on the calculated motor current A1, A2, A3, and the baseline current level. Method 600 may store the pump error type in the memory, and/or indicate the pump error type to the vehicle operator.

In one embodiment, the first position of the variable oil pump is the high displacement position, and the second position is the low displacement pump position. In one example, method 600 may determine that the pump is stuck in the low displacement pump position if the first motor current A1 is not lower than the baseline current level. In another example, the pump may be stuck in the low displacement position if the first motor current is not lower than the baseline current level, and the first motor current A1 is not lower than the second motor current A2. In yet another example, the pump may be stuck in the low displacement position if the first motor current is not lower than the baseline current level, the first motor current A1 is not lower than the second motor current A2, and the third current A3 is not lower than the second motor current A2.

In another embodiment, the first position of the variable oil pump is the low displacement position, and the second position is the high displacement pump position. In one example, method 600 may determine that the pump is stuck in the high displacement pump position if the first motor current is not greater than the baseline current level. In another example, the pump may be stuck in the high displacement position if the first motor current is not greater than the baseline current level, and the first motor current A1 is not greater than the second motor current A2. In yet another example, the pump may be stuck in the high displacement position if the first motor current is not greater than the baseline current level, the first motor current A1 is not greater than the second motor current A2, and the third current A3 is not greater than the second motor current A2.

If it is determined at 608 that the variable oil pump is stuck in the low displacement position, the future engine operation is adjusted at 610 to mitigate the adverse effect due to pump degradation. When the pump is stuck in the low displacement position, the pump may not provide sufficient engine oil to the engine during low engine speed, when the crankshaft speed is low. This may have detrimental effect on engine wear. In one embodiment, at 610, the engine idle speed may be increased responsive to the pump stuck in the low displacement position. Method 600 may also indicate the type of pump error at 610. For example, the type of the pump error may be uploaded to the cloud, indicated to the operator, and/or stored by setting a diagnostic code readable to a diagnostic reader.

At 612, fuel is injected into the cylinders, and engine combustion is initiated. As the engine speed increases, the motor may stop drawing current from the battery, and start supplying current to the battery as a generator.

FIG. 7 illustrates an example timeline of parameters within an engine system (such as the engine system of FIG. 1) while implementing the method of FIGS. 4-6. The engine system includes a variable oil pump such as the pump shown in FIG. 3A and FIG. 3B. Plot 710 is engine status. The engine status may be ON or OFF. Plot 720 shows the motor current 725. The motor current is positive when the motor is drawing current from the battery. The motor current is negative when the motor acts as a generator and charge the battery. Plot 730 is the position of the variable oil pump. The pump may be in either the high displacement position or the low displacement position. Plot 740 is the engine speed.

Engine speed increases as indicated by the arrow in the y axis. Plot 750 is the fuel injection amount. The amount of fuel injection increases as indicated by the y axis. The fuel injection amount is zero when the fuel injectors are disabled. Plot 760 is the status of the pump error flag. The status is ON when the pump error flag is set, and is OFF when the pump error flag is cleared. The x-axes of the plots are time. The time increases from the left to right.

From T0 to T1, the engine is ON, and the engine speed decreases. The motor current is negative, indicating that the motor is in the regenerative mode and supplying current to the battery. Fuel injection amount is non-zero and is decreasing. The pump is the high displacement position as the engine speed is lower than threshold 741. The pump error flag is not set.

At T1, the engine is turned off, and the engine speed is zero. The motor is stopped, and the motor current is zero. Fuel injection is also stopped.

At T2, after stopping the engine for the duration of ΔT, the engine is turned on. The engine may be turned on responsive to a key on event. As the engine soak time from T1 to T2 (ΔT) is longer than a threshold engine soak time, the controller determines to run the diagnosis procedure on the variable oil pump. In another embodiment, the controller may estimate/measure the engine temperature, and determine to diagnose the pump responsive to the engine temperature lower than a threshold temperature. The motor starts drawing current from the battery and cranking the engine. No fuel is injected during cranking. As a result of the cranking, engine speed increases from zero speed. From T2 to T3, the engine is cranked for a first duration of ΔT1. Motor current 725 is sampled as indicated by the crosses.

At T3, immediately after cranking the engine for the first duration, the controller may take an average of the sampled motor current during the first duration, and compare the average current A1 with the baseline current level 724. The pump error flag is set responsive to the average motor current A1 higher than the baseline current level. If there is no degradation in the variable oil pump, the motor current would be lower than the baseline current level, as shown in dashed line 721. Further, the controller sets the oil pump position to the low displacement position at T3, and continues cranking the engine with the motor. From T3 to T4, the engine is cranked with the variable oil pump in the low displacement position for the second duration of ΔT2. The second duration may be the same length as the first duration. The controller continues sampling the motor current 725.

At T4, the controller calculates the averaged motor current A2 during the second duration. If the variable oil pump is not degraded, the motor current during the second duration is higher than the current during the first duration. The dashed line 722 shows the motor current during the second duration in an engine system without pump degradation. Herein, the sampled motor current 725 is averaged and compared with the average motor current A1 during the first duration. The pump error flag remains ON as the average current during the second duration is not greater than the average current during the first duration. At T4, the controller also sets the pump to the high displacement position and continues cranking the engine unfueled. From T4 to T5, the engine is cranked for a third duration ΔT3. The third duration may be the same length as the first and the second duration. The controller continues sampling the motor current 725.

At T5, the controller calculates the averaged motor current A3 during the third duration. If the variable oil pump is not degraded, the motor current A3 during the third duration should be lower than the current A2 during the second duration. The dashed line 723 shows the motor current during the third duration in an engine system without pump degradation. Herein, the sampled motor current 725 is averaged and compared with the average motor current during the second duration. The pump error flag maintained ON as the average current A3 during the third duration is not lower than the average current A2 during the second duration. Further, since the first average current A1 is higher than the baseline current level, the second average current A2 is not higher than the first average current A1, and the third average current A3 is not lower than the second average current A2, the controller may determine the pump is stuck in the low displacement position. The controller may increase the current engine idle speed during the following engine operation.

At T6, responsive to the engine speed higher than the threshold speed 742, the controller initiates fuel injection and combustion in the cylinder. The motor current may decrease with increased engine speed.

At T7, responsive to engine speed higher than the threshold speed 741, if the pump is not degraded, the controller sets the pump to the low displacement position, as shown by dashed line 731.

FIG. 8 is an example method 800 for operating the oil pump based on the diagnosis made according to method presented in FIGS. 4-6. In particular, if no pump error is detected, the oil pump position may be adjusted based on engine speed and engine temperature. If pump degradation is detected, the pump operation may be adjusted to mitigate the pump degradation based on the type of the degradation. Method 800 may be stored in the non-transitory memory of a controller (such as controller 12), and be executed by the controller.

At 802, method 800 determines whether pump degradation has been identified. For example, the pump degradation may be identified if the pump error flag has been set. If the pump is degraded, method 800 moves to 808 to mitigate the pump error. Otherwise, method 800 moves to 804.

At 808, the engine operation is adjusted based on the pump error. In one embodiment, the engine operations may be adjusted responsive to the type of pump degradation. For example, if the pump is stuck in the low displacement position, the engine idle speed may be increased to provide sufficient lubrication at low engine speed.

At 804, method 800 determines whether the engine speed is higher than a threshold speed. The engine speed may be measured by the crankshaft rotation speed. The threshold speed may be predetermined during engine calibration. If the current engine speed is greater than the threshold speed, the oil pump is set to the low displacement position for reduced mass flow rate at pump outlet at 810. If the current engine speed is not greater than the threshold speed, the oil pump is set to the high displacement position at 806. By shifting the oil pump position responsive to engine speed, high fuel efficiency may be achieved.

At 812, method 800 determines engine temperature, and compare the engine temperature with a threshold temperature. The threshold temperature may be a pre-calibrated temperature at which the engine may be overheat and cause mechanical failure. The engine temperature may be estimated based on engine coolant temperature. If the engine temperature is not higher than the threshold temperature, the oil pump is maintained at current pump position. Otherwise, if the engine temperature is higher than the threshold temperature, at 816, the oil pump is set to the high displacement position to provide high mass flow rate at the pump outlet.

By increasing the oil flow through the pump, more engine oil may be provided to the engine cylinder walls to reduce the engine temperature.

FIG. 9 illustrates an example timeline of parameters within an engine system (such as the engine system of FIG. 1) while implementing the method of FIG. 8. The engine system includes a variable oil pump such as the pump shown in FIG. 3A and FIG. 3B. Plot 910 shows pump error flag. The pump error flag may be set (ON) responsive to pump degradation. Plot 920 shows engine speed. The engine speed increases as indicated by the y-axis. Plot 930 shows the engine temperature. The engine temperature increases as indicated by the y-axis. Plot 940 shows the oil pump position. The oil pump may be set to either the high displacement position or the low displacement position. Plot 950 shows the mass flow rate of the oil pump. The mass flow rate increases as indicated by the y-axis. The x-axes of the plots are time. The time increases as indicated by the x-axes.

From T0 to T1, the pump error flag is off. The engine temperature is lower than the threshold temperature of 931. Responsive to the engine speed lower than the threshold speed 921, the oil pump is set to the high displacement position to provide high pump mass flow.

At T1, the oil pump is set to the low displacement position responsive to the engine speed higher than the threshold speed 921. As a result of the oil pump position adjustment, pump mass flow remains at similar level as from T0 to T1 despite the increased engine speed.

At T2, the engine temperature exceeds the threshold temperature 931 and the engine speed is higher than the threshold speed 921. The oil pump is switched to the high displacement position to increase the engine oil flow. The engine cylinder may be cooled by the increased engine oil flow.

At T3, responsive to the engine temperature lower than the threshold temperature 931 and the engine speed higher than the threshold speed 921, the oil pump is set to the low displacement position for increased fuel efficiency.

At T4, responsive to the engine speed lower than the threshold speed 921, the oil pump is set to the high displacement position to maintain the mass flow rate of the oil pump.

At T5, the engine is operated in the idle mode. The engine may enter the idle mode when the vehicle is parked (zero vehicle speed) without stopping the engine. The engine runs at an idle speed of 923 from T5 to T6. In another embodiment, if the pump error flag is set as 912, the engine idle speed may be increased to idle speed 924. The idle speed 924 for degraded oil pump is higher than the idle speed 923 for non-degraded pump.

In this way, the variable oil pump may be diagnosed without introducing extra equipment to the engine system. The technical effect of diagnosing the pump during engine cranking is that the motor current may indicate the degree of fiction of the engine system and the mode of the variable oil pump. The technical effect of varying the modes of the variable oil pump during cranking is that the degradation may be robustly determined. Further, the type of the degradation may be determined. The technical effect of determining the type of the degradation is that mitigating actions may be taken to reduce engine wear. The technical effect of switching the pump position responsive to engine temperature is that the engine oil flow may be increased to cool the overheated engine.

As one embodiment, a method for an engine includes cranking an engine with a motor, and indicating degradation of an oil pump coupled to the engine based on a current of the motor sensed during the cranking. In a first example of the method, the oil pump is in a high displacement mode during the cranking. A second example of the method optionally includes the first example and further includes cranking the engine unfueled with the oil pump in the high displacement mode for a predetermined duration, the duration determined based on an engine oil temperature. A third example of the method optionally includes one or more of the first and second examples, and further includes cranking the engine unfueled with the oil pump in a low displacement mode after cranking the engine with the oil pump in the high displacement mode, sensing a second current of the motor while cranking the engine with the oil pump in the low displacement mode, and determining the degradation of the oil pump based further on the second current. A fourth example of the method optionally includes one or more of the first through third examples, and further includes, cranking the engine unfueled with the oil pump in the high displacement mode after cranking the engine with the oil pump in the low displacement mode, sensing a third current of the motor while cranking the engine with the oil pump in the high displacement mode, and determining degradation of the oil pump based on the third current and the second current. A fifth example of the method optionally includes one or more of the first through fourth examples, and further includes, determining degradation of the oil pump by comparing the current with a baseline current level. A sixth example of the method optionally includes one or more of the first through fifth examples, and further includes, increasing engine idle speed responsive to the current higher than the baseline current level. A seventh example of the method optionally includes one or more of the first through sixth examples, and further includes, determining the baseline current level as a function of an ambient temperature and an engine soak time. An eighth example of the method optionally includes one or more of the first through seventh examples, and further includes, wherein the engine is cranked after the engine is at rest for a duration greater than a threshold engine soak time.

As another embodiment, a method for an engine includes sensing a first current while cranking the engine unfueled for a first duration, a variable oil pump in a first position during the first duration; sensing a second current while cranking the engine unfueled for a second duration, the second duration immediately after the first duration, the variable oil pump in a second position during the second duration; and determining degradation of the variable pump based on the first current and the second current. In a first example of the method, wherein the first position is a high displacement position, and the second position is a low displacement position. A second example of the method optionally includes the first example and further includes determining degradation of the variable oil pump responsive to the second current not greater than the first current. A third example of the method optionally includes one or more of the first and second examples, and further includes determining the variable oil pump stuck in the low displacement position responsive to the first current higher than a baseline current level and the second current not greater than the first current. A fourth example of the method optionally includes one or more of the first through third examples, and further includes, increasing an engine idle speed responsive to the variable oil pump stuck in the low displacement position. A fifth example of the method optionally includes one or more of the first through fourth examples, and further includes, sensing a third current while cranking the engine unfueled for a third duration, the third duration immediately after the second duration, the variable oil pump in the first position during the third duration, and determining the degradation of the variable pump based further on the third current. A sixth example of the method optionally includes one or more of the first through fifth examples, and further includes, responsive to no indication of pump degradation, switching the oil pump position based on an engine temperature after starting the engine.

As yet another embodiment, an engine system includes an engine; a crankshaft coupled to the engine; a variable oil pump coupled to the crankshaft; a motor coupled to the crankshaft; a battery electrically coupled to the motor; fuel injectors coupled to the engine; and a controller with computer readable instructions stored in a non-transitory memory configured to: crank the engine with the motor without activating the fuel injectors; sense a first current drawn from the battery; determine degradation of the variable oil pump by comparing the first current with a baseline current level; and operate the engine responsive to the determined variable oil pump degradation. In a first example of the system, the system further includes a solenoid valve coupled to the variable oil pump, and the controller is further configured to deactivate the solenoid valve to set the variable displacement pump in a high displacement mode during cranking, and indicate the degradation of the variable oil pump responsive to the first current higher than the baseline current level. A second example of the system optionally includes the first example and further includes, wherein the controller is further configured to activate the solenoid valve to set the variable displacement pump in a low displacement position after cranking the engine with the variable displacement pump in the high displacement mode for a first duration; crank the engine without activating the fuel injectors for a second duration after the first duration; sense a second current drawn from the battery during the second duration; and determine the degradation of the variable oil pump based further on the second current. A third example of the method optionally includes one or more of the first and second examples, and further includes, wherein the controller is further configured to determine a type of the degradation, and operate the engine responsive to the type of the degradation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
cranking an engine with a motor, and indicating degradation of an oil pump coupled to the engine based on a current of the motor sensed during the cranking, wherein the engine is cranked after the engine is at rest for a duration greater than a threshold engine soak time.

2. The method of claim 1, wherein the oil pump is in a high displacement mode during the cranking.

3. The method of claim 2, further comprising cranking the engine unfueled with the oil pump in the high displacement mode for a duration, the duration determined based on an engine oil temperature.

4. The method of claim 2, further comprising cranking the engine unfueled with the oil pump in a low displacement mode after cranking the engine with the oil pump in the high displacement mode, sensing a second current of the motor while cranking the engine with the oil pump in the low displacement mode, and determining the degradation of the oil pump based further on the second current.

5. The method of claim 4, further comprising cranking the engine unfueled with the oil pump in the high displacement mode after cranking the engine with the oil pump in the low displacement mode, sensing a third current of the motor while cranking the engine with the oil pump in the high displacement mode, and determining degradation of the oil pump based on the third current and the second current.

6. The method of claim 1, further comprising determining degradation of the oil pump by comparing the current with a baseline current level.

7. The method of claim 1, further comprising increasing engine idle speed responsive to the degradation.

8. A method comprising:
cranking an engine with a motor, and indicating degradation of an oil pump coupled to the engine based on a current of the motor sensed during the cranking;
determining degradation of the oil pump by comparing the current with a baseline current level; and
increasing engine idle speed responsive to the current being higher than the baseline current level.

9. The method of claim 8, further comprising determining the baseline current level as a function of an ambient temperature and an engine soak time.

10. A method comprising:
sensing a first current while cranking the engine unfueled for a first duration, a variable oil pump in a first position during the first duration;
sensing a second current while cranking the engine unfueled for a second duration, the second duration immediately after the first duration, the variable oil pump in a second position during the second duration; and
indicating degradation of the variable oil pump based on the first current and the second current.

11. The method of claim 10, wherein the first position is a high displacement position and the second position is a low displacement position.

12. The method of claim 11, further comprising determining degradation of the variable oil pump responsive to the second current not greater than the first current.

13. The method of claim 11, further comprising determining the variable oil pump is stuck in the low displacement position responsive to the first current higher than a baseline current level and the second current not greater than the first current.

14. The method of claim 13, further comprising increasing an engine idle speed responsive to the variable oil pump being stuck in the low displacement position.

15. The method of claim 10, further comprising sensing a third current while cranking the engine unfueled for a third duration, the third duration immediately after the second duration, the variable oil pump in the first position during the third duration, and determining the degradation of the variable pump based further on the third current.

16. The method of claim 10, further comprising, responsive to no indication of variable oil pump degradation, switching the variable oil pump position based on an engine temperature after starting the engine.

* * * * *